(12) United States Patent
Seo

(10) Patent No.: US 8,026,647 B2
(45) Date of Patent: Sep. 27, 2011

(54) GENERATOR-BRAKE INTEGRATION TYPE ROTATING MACHINE

(75) Inventor: Jinkyu Seo, Kyounggi Do (KR)

(73) Assignee: Advanced Drive Technology Co., Ltd., Gunpo-si (KR)

( * ) Notice: Subject to any disclaimer, the term of this patent is extended or adjusted under 35 U.S.C. 154(b) by 406 days.

(21) Appl. No.: 12/248,213

(22) Filed: Oct. 9, 2008

(65) Prior Publication Data

US 2009/0309522 A1    Dec. 17, 2009

(30) Foreign Application Priority Data

Apr. 25, 2008   (KR) ........................ 10-2008-0038545

(51) Int. Cl.
*H02K 49/04* (2006.01)
*F16D 27/01* (2006.01)
*B60L 7/28* (2006.01)

(52) U.S. Cl. ......... 310/105; 310/103; 188/161; 188/267

(58) Field of Classification Search ............. 310/77, 310/92–93, 103, 105, 101, 108; 192/84.1, 192/84.3; 188/161, 266–267
See application file for complete search history.

(56) References Cited

U.S. PATENT DOCUMENTS

| | | | |
|---|---|---|---|
| 4,937,483 A * | 6/1990 | Matsui et al. | 310/105 |
| 5,054,587 A * | 10/1991 | Matsui et al. | 188/267 |
| 5,986,370 A * | 11/1999 | Cheng | 310/77 |
| 6,084,325 A | 7/2000 | Hsu | |
| 6,237,728 B1 * | 5/2001 | Kobayashi et al. | 188/158 |
| 6,346,752 B1 * | 2/2002 | Osada et al. | 310/43 |
| 6,581,731 B2 * | 6/2003 | Chen | 188/164 |
| 6,952,063 B1 * | 10/2005 | Chen | 310/93 |
| 7,018,324 B1 | 3/2006 | Lin | |

FOREIGN PATENT DOCUMENTS

JP     1995-143732 A    6/1995

* cited by examiner

*Primary Examiner* — Burton Mullins
(74) *Attorney, Agent, or Firm* — LRK Patent Law Firm

(57) ABSTRACT

A generator-brake integration type rotating machine comprises an inertia disk coupled to a shaft to rotate; a rotor ring rotating around the shaft inside the inertia disk and having magnets mounted to a circumferential outer surface thereof; and a laminated yoke positioned between the inertia disk and the rotor ring, and having brake coils located at regular angular intervals on a circumferential outer surface thereof and generator coils located at regular angular intervals on a circumferential inner surface thereof. The generator coils are wound on first bobbins which project inward from the circumferential inner surface of the laminated yoke, and the brake coils are wound on second bobbins which project outward from the circumferential outer surface of the laminated yoke. The laminated yoke is fixedly coupled to a stator holder, which in turn is coupled to the shaft by way of a bearing and is fixedly coupled to a housing.

9 Claims, 9 Drawing Sheets

[Fig. 1]
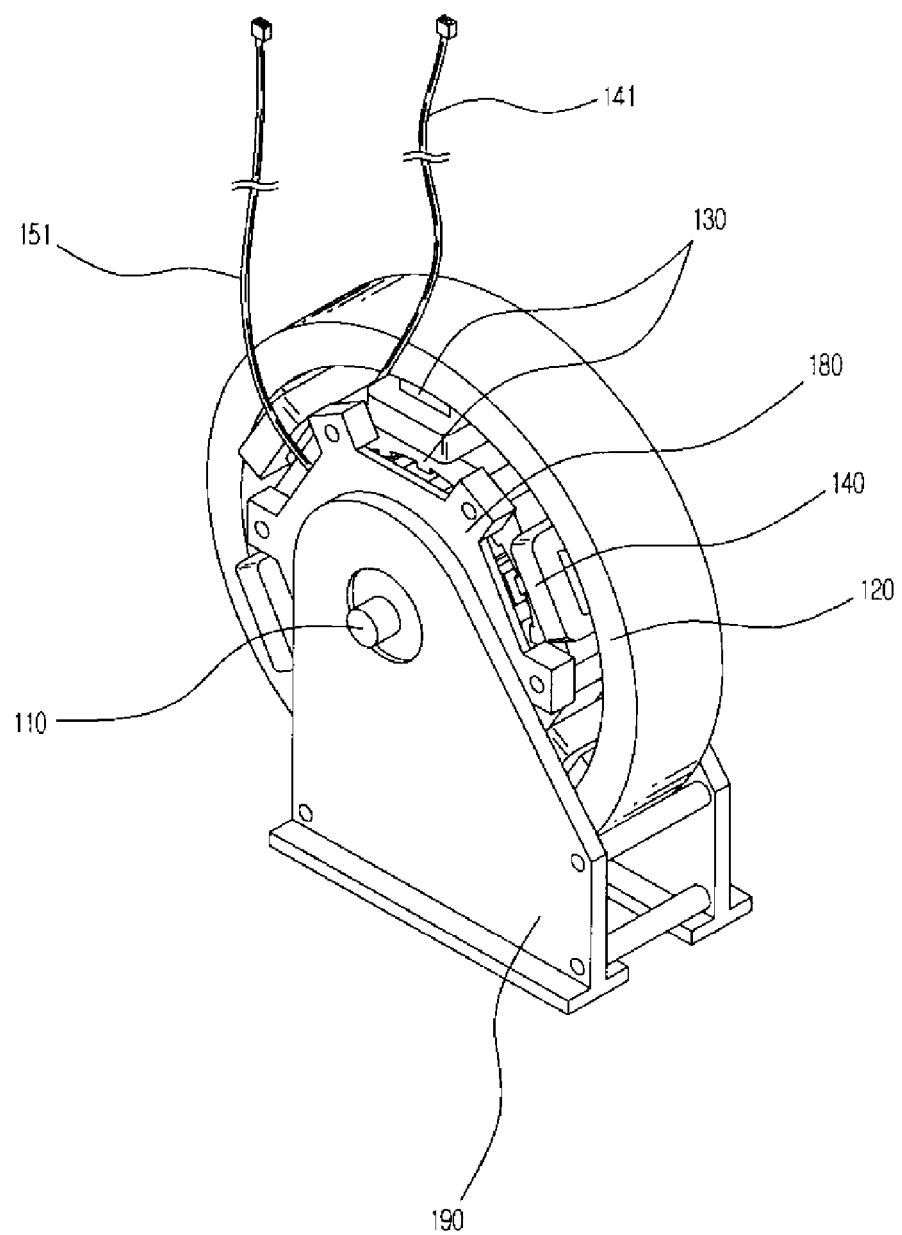

[Fig. 2]
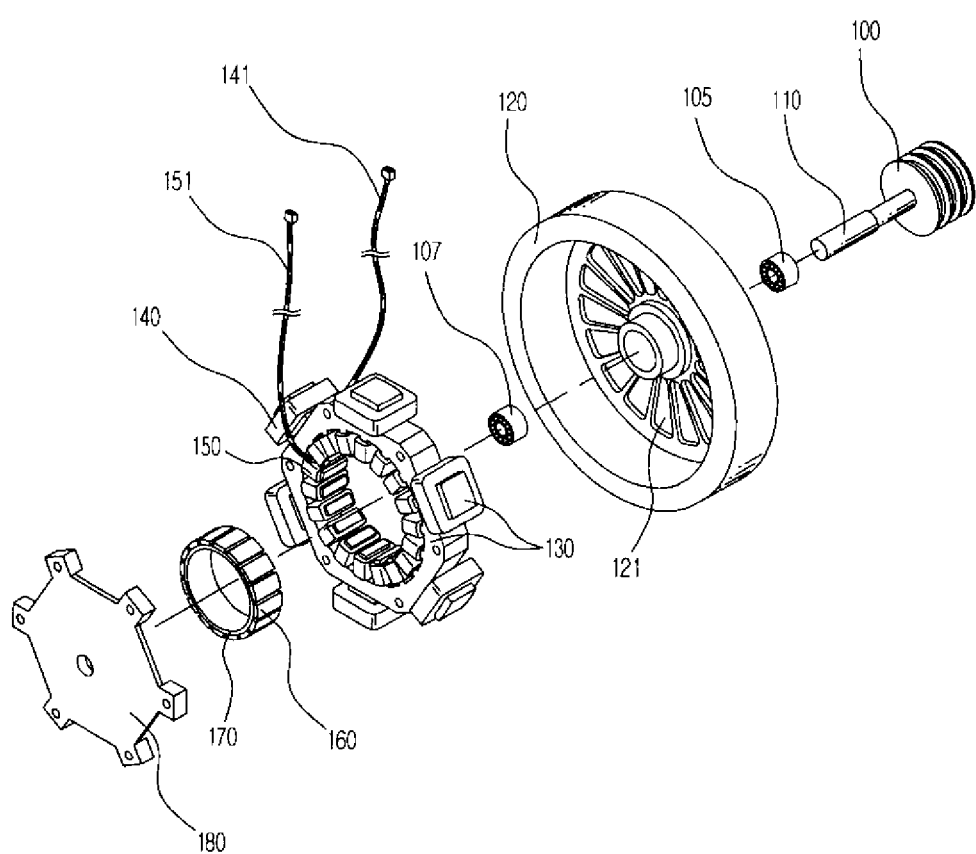

[Fig. 3]
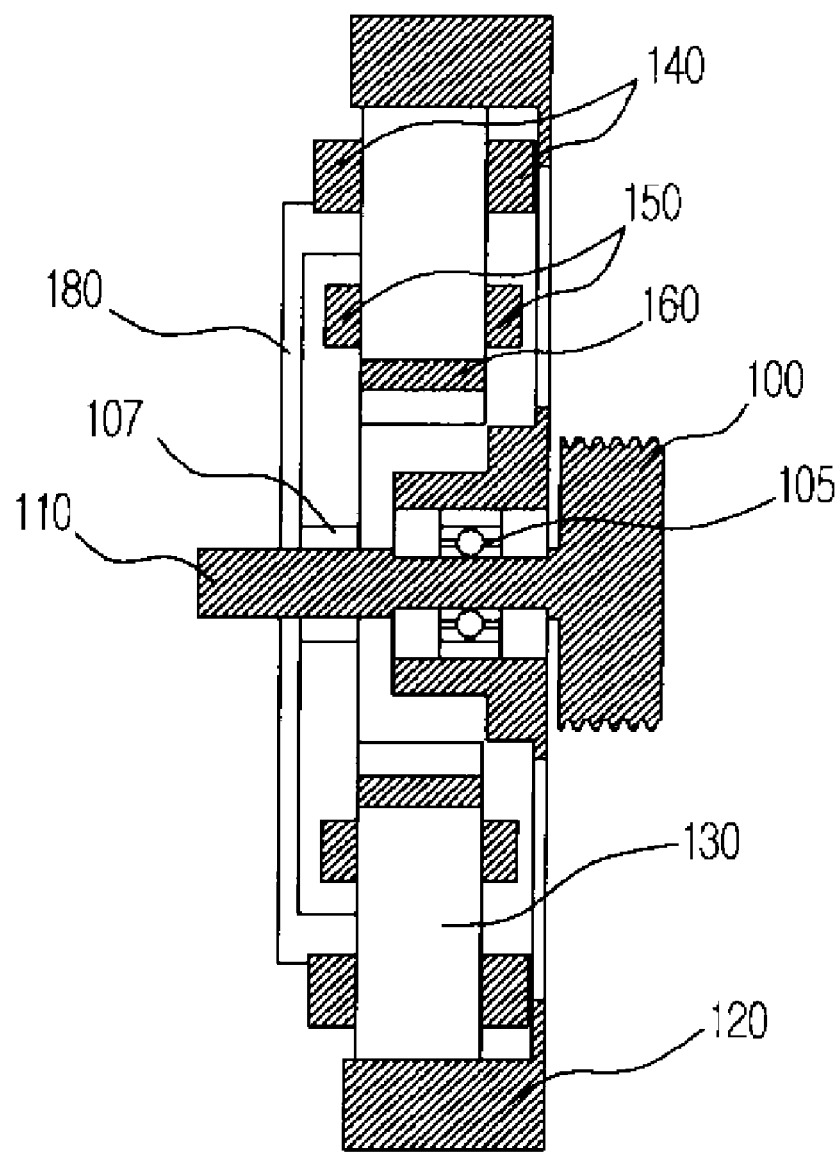

[Fig. 4a]
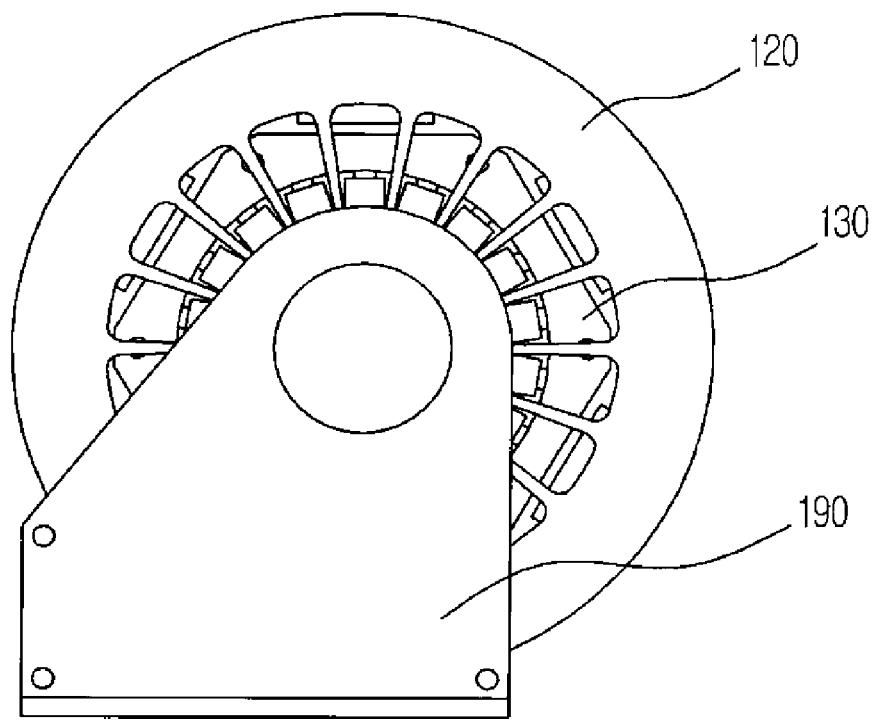

【Fig. 4b】
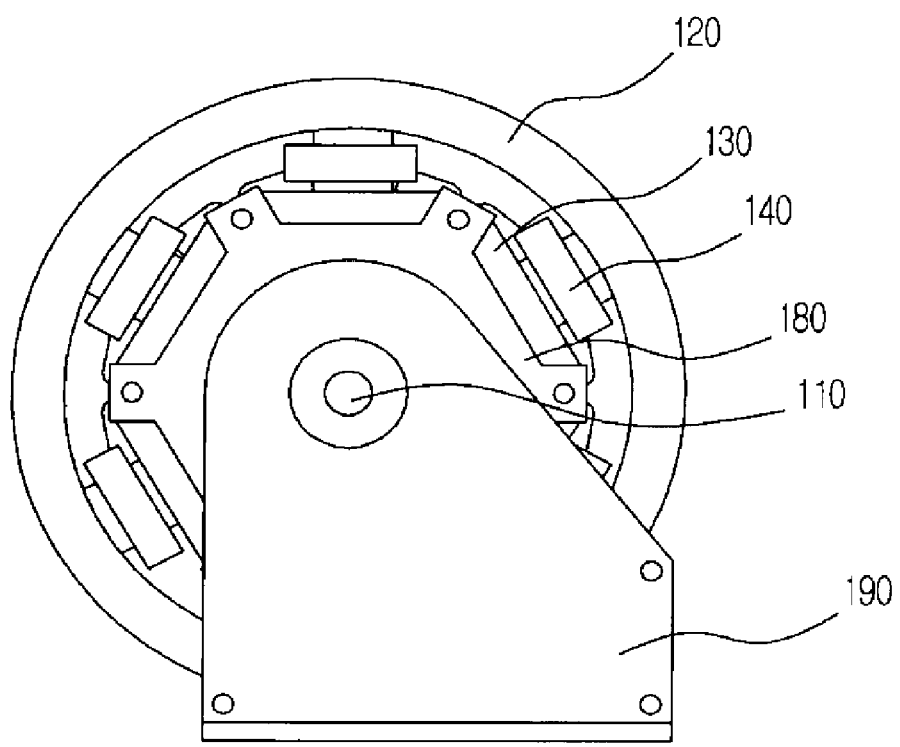

[Fig. 5]
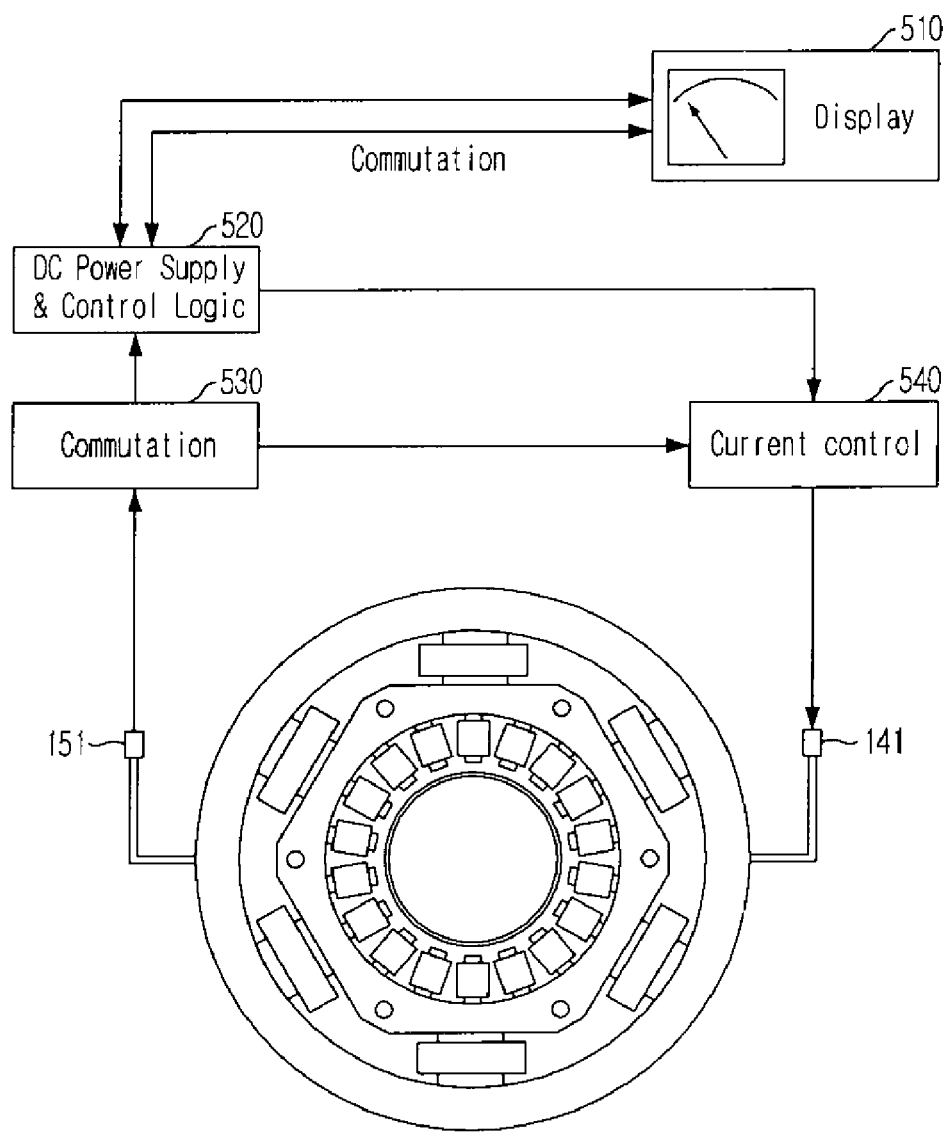

[Fig. 6]
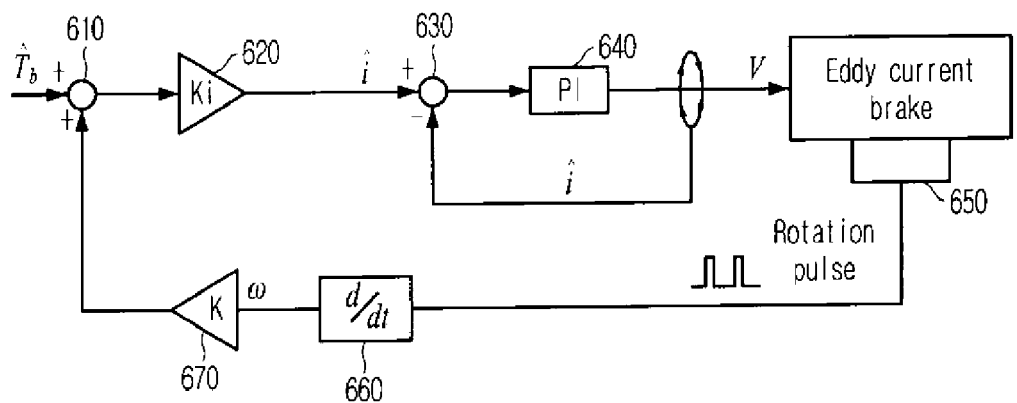

【Fig. 7】
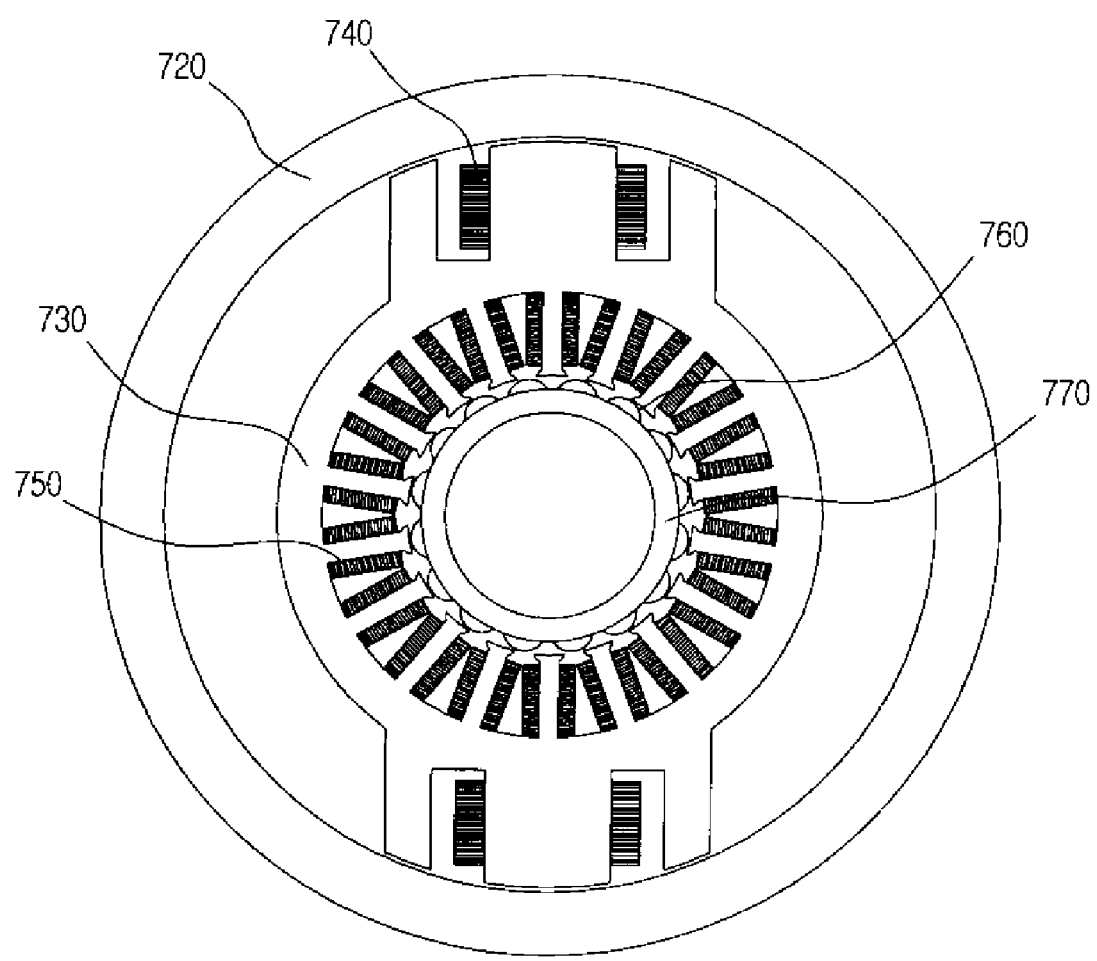

[Fig. 8]
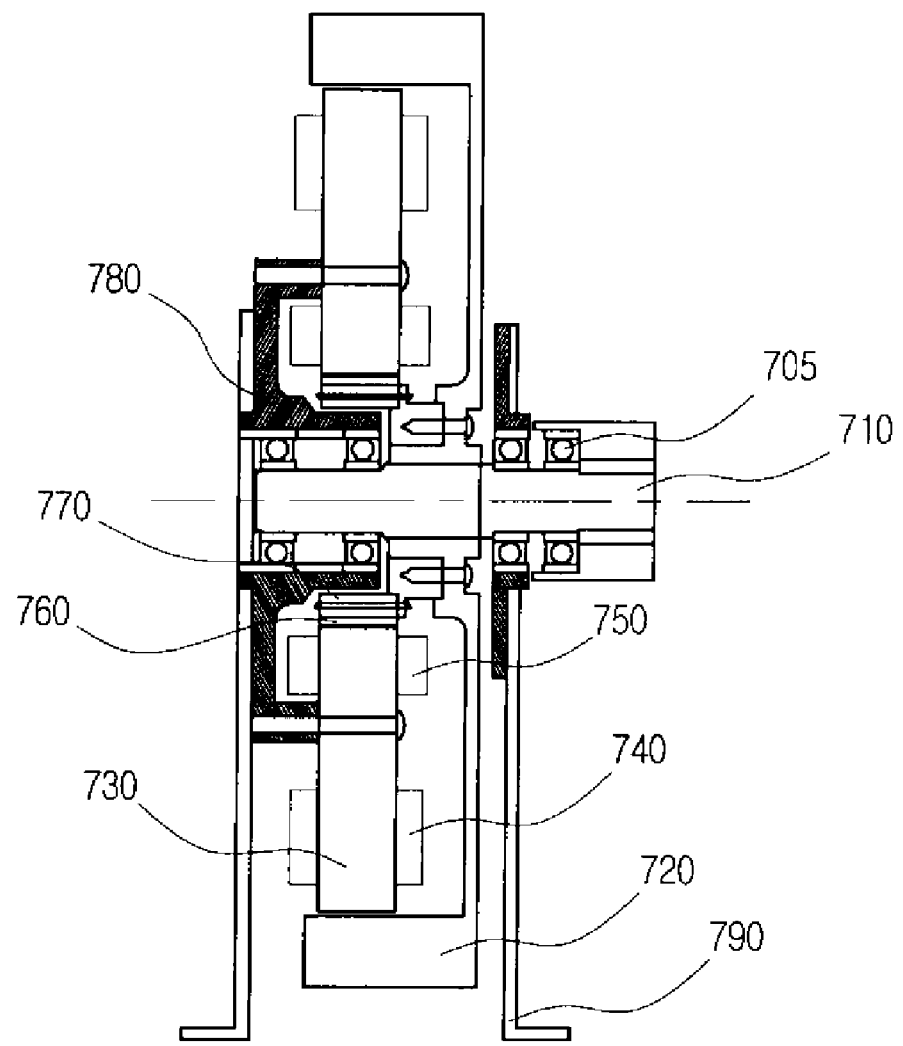

GENERATOR-BRAKE INTEGRATION TYPE ROTATING MACHINE

BACKGROUND OF THE INVENTION

1. Field of the Invention

The present invention relates to a generator-brake integration type rotating machine, and more particularly, to a generator-brake integration type rotating machine which can obtain braking force using electricity generated by external rotational kinetic energy.

2. Description of the Related Art

In general, in devices requiring braking force, the following factors should be considered. First, the braking force must have no ripple. Second, the same braking force should be obtained under the same set values. Third, the devices must have inertia force. Fourth, braking should be performed in a silent manner.

Meanwhile, devices for obtaining braking force through mechanical friction between two objects moving relative to each other have problems as described below. That is to say, frictional heat is generated, frictional surfaces are unevenly worn, and braking force is changed due to the alteration of physical properties.

In order to cope with these problems, recently, research has been conducted for devices which can generate braking force using eddy current. In this case of using eddy current, the problems in relation to ripple, wear, noise, etc. can be solved. However, since braking force generated by eddy current is nonlinear in relation to current, speed, temperature, physical properties, etc., it is difficult to control the braking force.

For this reason, the devices for generating braking force using eddy current are currently being adopted for simple application.

For example, the brake device with a combination of power-generating and eddy-current magnetic resistance disclosed in U.S. Pat. No. 6,084,325 has a disk which rotates, a brake yoke which is disposed outside the disk, and a generator which is disposed inside the disk, such that braking force can be provided through self-generation without using an external power source.

Nevertheless, in the brake device with a combination of power-generating and eddy-current magnetic resistance disclosed in U.S. Pat. No. 6,084,325, a solenoid for generating eddy current is disposed outside the disk, and the generator is disposed inside the disk. In this case, while braking force can be maximized, an air gap is likely to be changed due to machining errors and assembly errors. Also, since magnets are attached to the heat generating section of the disk, the characteristics of the magnets are apt to be deteriorated with the lapse of time. Therefore, a disadvantage is caused in that the size of the magnets increases in order to suppress the change in the characteristics of the magnets by heat. Further, because inertia compensation is not conducted in the brake device, another disadvantage is caused in that the size of the disk markedly increases. Moreover, due to the fact that only one solenoid is used so as to obtain sufficient torque, the temperature of the heat generated in coils may be excessively increased, and it is difficult to constantly control torque because of current change due to a rise in the temperature of the coils. In addition, since a solenoid yoke is disposed at one side, force is concentratedly applied to one side. Therefore, the functionality of a bearing, which supports a shaft, may be degraded, and the available service life of the bearing can be shortened.

For another example, an autonomous generation brake assembly disclosed in U.S. Pat. No. 6,581,731 has a solenoid yoke, in which a solenoid for a brake and a solenoid for a generator are integrated with each other, in a core. Since the autonomous generation brake assembly is a core integration type, errors can be reduced in the fabrication procedure thereof. However, the solenoids of the brake and the generator are not positioned at regular angular intervals in the circumferential direction. Due to this fact, a number of magnets are needed for the generation of electricity, and torque ripple increases during the generation of electricity. Further, because the solenoid for the brake is positioned inside the yoke, the magnitude of braking torque by eddy current considerably decreases. Hence, in order to prevent the braking torque from decreasing, coils having a large number of turns are needed.

For further example, in the magnetic controlled loading device in combination of a power generating set and an adjusting drive mechanism disclosed in U.S. Pat. No. 7,018,324, the amount of eddy current generated in a metal conductor increases as the distance between the metal conductor and permanent magnets is shortened, and therefore, braking force can be increased. The device employs compression springs to push a magnetic plate toward a flywheel.

Nonetheless, since the elasticity of the compression springs changes with the lapse of time, the air gap between the metal conductor and the permanent magnets during a single rotation of a motor may vary, whereby the braking force can be changed. In addition, because the length of the air gap and the magnitude of braking torque have a nonlinear relationship, a drawback is caused in that it is difficult to control a brake.

SUMMARY OF THE INVENTION

Accordingly, the present invention has been made in an effort to solve the problems occurring in the related art, and an object of the present invention is to provide a generator-brake integration type rotating machine in which a generator-side yoke and a brake-side yoke are integrally constructed so that the size of the rotating machine can be decreased and mechanical errors can be reduced.

Another object of the present invention is to provide a generator-brake integration type rotating machine in which a rotor and a disk are separated from each other as far as possible so that the influence of the heat generated due to eddy current on the magnets arranged on the rotor can be minimized.

Still another object of the present invention is to provide a generator-brake integration type rotating machine in which the resultant force vector by radial magnetic force becomes zero so that the change in the characteristics of the brake due to a rise in the temperature of coils can be suppressed.

In order to achieve the above objects, according to one aspect of the present invention, there is provided a generator-brake integration type rotating machine comprising an inertia disk coupled to a shaft to rotate; a rotor ring rotating around the shaft inside the inertia disk and having a plurality of magnets mounted to a circumferential outer surface thereof; and a laminated yoke positioned between the inertia disk and the rotor ring, and having a plurality of brake coils located at regular angular intervals on a circumferential outer surface thereof and a plurality of generator coils located at regular angular intervals on a circumferential inner surface thereof, wherein the plurality of generator coils are respectively wound on a plurality of first bobbins which project inward from the circumferential inner surface of the laminated yoke, and the plurality of brake coils are respectively wound on a plurality of second bobbins which project outward from the circumferential outer surface of the laminated yoke, and wherein the laminated yoke is fixedly coupled to a stator holder, and the stator holder is coupled to the shaft by way of a bearing and is fixedly coupled to a housing.

According to another aspect of the present invention, at least two brake coils are located on the circumferential outer surface of the laminated yoke.

According to another aspect of the present invention, the brake coils are positioned on the circumferential outer surface of the laminated yoke which has the sectional shape of an 'E'.

According to still another aspect of the present invention, the rotating machine further comprises a generator coil output section electrically connected with the generator coils; a commutating section for commutating an alternate current voltage outputted from the generator coil output section; a DC power supply and control section for converting an output voltage of the commutating section into a predetermined voltage level and generating a speed control signal for compensating an inertia torque, in response to an input from a user; a current control section for receiving an output of the commutating section and controlling an intensity of current, to be outputted to a brake coil input section, in response to the speed control signal; and a display section for communicating with the DC power supply and control section and displaying a rotational speed.

According to a still further aspect of the present invention, the DC power supply and control section comprises a torque adder for adding a torque command inputted by the user and an inertia torque depending upon a rotational speed of the inertia disk and outputting a compensating torque; a current output unit for converting the compensating torque outputted from the torque adder into a current command; a current subtracter for subtracting a measured actual current from the current command outputted from the current output unit; a proportional integrator for proportionally integrating a compensating current from the current subtracter and applying the resultant value to the brake coil input section; a rotation pulse generator for measuring a rotational speed of the inertia disk and outputting a rotational speed value in the type of a pulse; a differentiator for differentiating the rotational speed value outputted from the rotation pulse generator; and an inertia torque output unit for multiplying an angular velocity outputted from the differentiator by a predetermined coefficient and outputting an inertia torque.

BRIEF DESCRIPTION OF THE DRAWINGS

The above objects, and other features and advantages of the present invention will become more apparent after a reading of the following detailed description taken in conjunction with the drawings, in which:

FIG. 1 is a perspective view illustrating a generator-brake integration type rotating machine in accordance with one embodiment of the present invention;

FIG. 2 is an exploded perspective view illustrating the main part of the generator-brake integration type rotating machine according to one embodiment of the present invention;

FIG. 3 is a side sectional view of the generator-brake integration type rotating machine;

FIG. 4a is a left side view of the generator-brake integration type rotating machine;

FIG. 4b is a right side view of the generator-brake integration type rotating machine;

FIG. 5 is a block diagram illustrating the entire system of the generator-brake integration type rotating machine according to one embodiment of the present invention;

FIG. 6 is a control block diagram of the generator-brake integration type rotating machine according to one embodiment of the present invention;

FIG. 7 is a front sectional view illustrating a generator-brake integration type rotating machine in accordance with another embodiment of the present invention; and FIG. 8 is a side sectional view illustrating the generator-brake integration type rotating machine according to another embodiment of the present invention.

DETAILED DESCRIPTION OF PREFERRED EMBODIMENTS

Reference will now be made in greater detail to preferred embodiments of the invention, examples of which are illustrated in the accompanying drawings. Wherever possible, the same reference numerals will be used throughout the drawings and the description to refer to the same or like parts.

FIG. 1 is a perspective view illustrating a generator-brake integration type rotating machine in accordance with one embodiment of the present invention, FIG. 2 is an exploded perspective view illustrating the main part of the generator-brake integration type rotating machine according to one embodiment of the present invention, FIG. 3 is a side sectional view of the generator-brake integration type rotating machine, FIG. 4a is a left side view of the generator-brake integration type rotating machine, and FIG. 4b is a right side view of the generator-brake integration type rotating machine.

In a generator-brake integration type rotating machine in accordance with one embodiment of the present invention, an inertia disk 120 is coupled to a shaft 110. In one example, the inertia disk 120 can be coupled to the shaft 110 through fitting. In another example, the inertia disk 120 can be coupled to the shaft 110 using a key. As shown in the drawings, in one example of the present embodiment, a rotor ring 170 can be coupled to the inertia disk 120. In another example, the rotor ring 170 can be directly coupled to the shaft 110 using a key. Here, the inertia disk 120 is made of a metallic material which can increase braking force by eddy current.

A belt wheel 100 can be positioned on one end of the shaft 110. A plurality of magnets 160 are attached to the circumferential outer surface of the rotor ring 170 in a surface mounting type. In the present embodiment, the magnets 160 can comprise ferrite magnets. A laminated yoke 130 is placed between the inertia disk 120 and the rotor ring 170 having the magnets 160 attached thereto, in the state in which the laminated yoke 130 is fixedly coupled to a stator holder 180. The stator holder 180 is coupled to the shaft 110 by way of a bearing 107 and is fixedly coupled to a housing 190.

In the present embodiment, the laminated yoke 130 includes a plurality of first bobbins projecting inward from the circumferential inner surface thereof and a plurality of second bobbins projecting outward from the circumferential outer surface thereof. Generator coils 150 are wound on the plurality of first bobbins, and brake coils 140 are wound on the plurality of second bobbins. That is to say, the plurality of generator coils 150 are located on the circumferential inner surface of the laminated yoke 130 at regular angular intervals, and the plurality of brake coils 140 are located on the circumferential outer surface of the laminated yoke 130 at regular angular intervals. Also, while six brake coils 140 are shown in FIG. 2, the present invention is not limited by a specific number of coils. In other words, so long as the solenoid coils for generating eddy current are concurrently located at regular angular intervals, the brake coils 140 may have an odd number or an even number.

FIG. 5 is a block diagram illustrating the entire system of the generator-brake integration type rotating machine according to one embodiment of the present invention.

The system of the generator-brake integration type rotating machine according to one embodiment of the present invention includes a generator coil output section 151, a commutating section 530 for commutating the alternate current voltage outputted from the generator coil output section 151, a current control section 540 for receiving the output of the commutating section 530 and controlling the intensity of current, to be outputted to a brake coil input section 141, in response to a speed control signal, a DC power supply and control section 520 for converting the output voltage of the commutating section 530 into a predetermined voltage level and generating the speed control signal in response to an input from a user, and a display section 510 for communicating with the control section 520 and displaying a rotational speed.

According to the present embodiment, as external rotational force is transferred to the shaft 110 and the shaft 110 is rotated, the magnets 160 mounted on the rotor ring 170 and integrated with the shaft 110 and the generator coils 150 magnetically interact with each other and generate electricity. When the voltage generated by the generator coils 150 reaches a threshold, the control section 520 and the display section 510 are activated.

FIG. 6 is a control block diagram of the generator-brake integration type rotating machine according to one embodiment of the present invention.

The system of the generator-brake integration type rotating machine according to one embodiment of the present invention includes a torque adder 610 for adding a torque command inputted by the user and an inertia torque depending upon the rotational speed of the inertia disk 120 and outputting a compensating torque, a current output unit 620 for converting the compensating torque into a current command, a current subtracter 630 for subtracting a measured actual current from the current command outputted from the current output unit 620, a proportional integrator 640 for proportionally integrating a compensating current from the current subtracter 630 and applying the resultant value to the brake coil input section 141, a rotation pulse generator 650 for measuring the rotational speed of the inertia disk 120 and outputting a rotational speed value in the type of a pulse, a differentiator 660 for differentiating the rotational speed value outputted from the rotation pulse generator 650, and an inertia torque output unit 670 for multiplying the angular velocity outputted from the differentiator 660 by a predetermined coefficient and outputting an inertia torque.

In the system of the generator-brake integration type rotating machine, because the magnitude of braking force by eddy current is determined as a function of the rotational speed of the inertia disk and the current flowing through the brake coils, by measuring these two factors, it is possible to control the braking force.

When assuming that the generator generates a predetermined torque by a predetermined load current and the power consumed by the control elements excluding the brake is constant, by measuring the current flowing through the brake, the torque component by the generator can be calculated. The current control section 540 performs current control through communication with the outside or in response to a brake command set by a user interface, as a result of which constant torque control is implemented.

Meanwhile, in the event that there is a difference between the speed inputted from the outside and the rotational speed of the inertia disk, that is, acceleration or deceleration occurs, an actual inertia compensating algorithm is employed. The inertia compensating algorithm is a control algorithm that allows the user to feel the same inertia as under the actual running condition when the rotational inertia of the disk is designed to be less than a rotating speed ratio. The rotational inertia serves as a predetermined torque coefficient when torque is applied from the outside and performs the function of maintaining rotational motion when deceleration occurs.

FIG. 7 is a front sectional view illustrating a generator-brake integration type rotating machine in accordance with another embodiment of the present invention, and FIG. 8 is a side sectional view illustrating the generator-brake integration type rotating machine according to another embodiment of the present invention.

A generator-brake integration type rotating machine in accordance with another embodiment of the present invention includes a bearing 705, a shaft 710, an inertia disk 720, a laminated yoke 730, brake coils 740, generator coils 750, magnets 760, a rotor ring 770, a stator holder 780, and a housing 790.

The construction of the generator-brake integration type rotating machine according to the present embodiment is substantially similar to that of the embodiment shown in FIGS. 1 through 4. However, in the generator-brake integration type rotating machine according to one embodiment of the present invention shown in FIGS. 1 through 4, six brake coils 140 are located on the circumferential outer surface of the laminated yoke 130, whereas, in the generator-brake integration type rotating machine according to another embodiment of the present invention shown in FIGS. 7 and 8, two brake coils 740 are located on the circumferential outer surface of the laminated yoke 730.

In the present embodiment, the laminated yoke 730, on which the brake coils 740 are located, is positioned inside the circumferential inner surface of the inertia disk while having the sectional shape of an 'E', so that the length of a closed loop with respect to magnetic flux on a magnetic circuit can be decreased, whereby magnetic loss can be lessened.

In the generator-brake integration type rotating machine according to the present invention, since a generator-side yoke and a brake-side yoke are integrally constructed, the size of the rotating machine can be decreased and mechanical errors can be reduced. The magnetic flux generated in the generator side does not exert a substantial influence on the uniformity of braking force.

Also, in the generator-brake integration type rotating machine according to the present invention, because the braking force generated by eddy current is transferred to an inertia disk in the form of thermal energy, by separating a rotor and the inertia disk as far as possible, the influence of the heat generated due to the eddy current on the magnets arranged on the rotor can be minimized.

Further, in the generator-brake integration type rotating machine according to the present invention, by concurrently locating solenoid coils for the generation of eddy current at regular angular intervals, since the resultant force vector by radial magnetic force becomes zero, the change in the characteristics of the brake due to a rise in the temperature of the coils can be suppressed.

Moreover, in the generator-brake integration type rotating machine according to the present invention, it is possible to accomplish the characteristics of the brake, for which constant torque control is enabled.

Although preferred embodiments of the present invention have been described for illustrative purposes, those skilled in the art will appreciate that various modifications, additions and substitutions are possible, without departing from the scope and the spirit of the invention as disclosed in the accompanying claims.

What is claimed is:

1. A generator-brake integration type rotating machine comprising:

an inertia disk coupled to a shaft to rotate;

a rotor ring rotating around the shaft inside the inertia disk and having a plurality of magnets mounted to a circumferential outer surface thereof;

a laminated yoke positioned between the inertia disk and the rotor ring, and having a plurality of brake coils located at regular angular intervals on a circumferential outer surface thereof and a plurality of generator coils located at regular angular intervals on a circumferential inner surface thereof;

a generator coil output section electrically connected with the generator coils;

a commutating section for commutating an alternate current voltage outputted from the generator coil output section;

a DC power supply and control section for converting an output voltage of the commutating section into a predetermined voltage level and generating a speed control signal for compensating an inertia torque, in response to an input from a user;

a current control section for receiving an output of the commutating section and controlling an intensity of current, to be outputted to a brake coil input section, in response to the speed control signal; and a display section for communicating with the DC power supply and control section and displaying a rotational speed, wherein the plurality of generator coils are respectively wound on a plurality of first bobbins which project inward from the circumferential inner surface of the laminated yoke, and the plurality of brake coils are respectively wound on a plurality of second bobbins which project outward from the circumferential outer surface of the laminated yoke, wherein the laminated yoke is fixedly coupled to a stator holder, and the stator holder is coupled to the shaft by way of a bearing and is fixedly coupled to a housing, and wherein the DC power supply and control section comprises:

a torque adder for adding a torque command inputted by the user and an inertia torque depending upon a rotational speed of the inertia disk and outputting a compensating torque;

a current output unit for converting the compensating torque outputted from the torque adder into a current command;

a current subtracter for subtracting a measured actual current from the current command outputted from the current output unit;

a proportional integrator for proportionally integrating a compensating current from the current subtracter and applying the resultant value to the brake coil input section;

a rotation pulse generator for measuring a rotational speed of the inertia disk and outputting a rotational speed value in the type of a pulse;

a differentiator for differentiating the rotational speed value outputted from the rotation pulse generator, and an inertia torque output unit for multiplying an angular velocity outputted from the differentiator by a predetermined coefficient and outputting an inertia torque.

2. The rotating machine according to claim 1, wherein at least two brake coils are located on the circumferential outer surface of the laminated yoke.

3. The rotating machine according to claim 2, wherein the brake coils are positioned on the circumferential outer surface of the laminated yoke which has the sectional shape of an 'E'.

4. The rotating machine according to claim 2, wherein the inertia disk is coupled to the shaft through fitting.

5. The rotating machine according to claim 2, wherein the inertia disk is coupled to the shaft using a key.

6. The rotating machine according to claim 4, wherein the rotor ring is fixedly coupled to the inertia disk.

7. The rotating machine according to claim 4, wherein the rotor ring is fixedly coupled to the shaft.

8. The rotating machine according to claim 5, wherein the rotor ring is fixedly coupled to the inertia disk.

9. The rotating machine according to claim 5, wherein the, rotor ring is fixedly coupled to the shaft.

* * * * *